(12) United States Patent
Fushimi et al.

US009056929B2

(10) Patent No.: US 9,056,929 B2
(45) Date of Patent: Jun. 16, 2015

(54) CATALYST FOR THE POLYMERIZATION OF OLEFINS

(75) Inventors: Masaki Fushimi, Eschborn (DE); Marc Oliver Kristen, Sulzbach (DE); Martin Schneider, Hochheim (DE); Giampiero Morini, Padua (IT)

(73) Assignee: Basell Poliolefine Italia S.r.l., Milan (IT)

( * ) Notice: Subject to any disclaimer, the term of this patent is extended or adjusted under 35 U.S.C. 154(b) by 94 days.

(21) Appl. No.: 12/996,018

(22) PCT Filed: Jun. 5, 2009

(86) PCT No.: PCT/EP2009/056952
§ 371 (c)(1),
(2), (4) Date: Dec. 3, 2010

(87) PCT Pub. No.: WO2009/150106
PCT Pub. Date: Dec. 17, 2009

(65) Prior Publication Data
US 2011/0077368 A1    Mar. 31, 2011

Related U.S. Application Data

(60) Provisional application No. 61/132,345, filed on Jun. 18, 2008.

(30) Foreign Application Priority Data

Jun. 13, 2008  (EP) ..................................... 08158175

(51) Int. Cl.
C08F 4/50    (2006.01)
C08F 10/02   (2006.01)
C08F 10/00   (2006.01)

(52) U.S. Cl.
CPC ................. *C08F 10/02* (2013.01); *C08F 10/00* (2013.01)

(58) Field of Classification Search
CPC ....................................................... C08F 4/50
USPC ...................................................... 526/125.7
See application file for complete search history.

(56) References Cited

U.S. PATENT DOCUMENTS

| 4,356,295 | A | * | 10/1982 | Fujii et al. ................... 526/125.5 |
| 4,399,054 | A | | 8/1983 | Ferraris et al. |
| 4,469,648 | A | | 9/1984 | Ferraris et al. |
| 4,657,998 | A | * | 4/1987 | Malpass ........................ 526/144 |
| 4,829,034 | A | | 5/1989 | Iskolan et al. |
| 5,100,849 | A | | 3/1992 | Miya et al. |
| 5,221,651 | A | | 6/1993 | Sacchetti et al. |
| 5,863,995 | A | | 1/1999 | Daire |
| 5,990,251 | A | | 11/1999 | Gelus |
| 6,627,710 | B1 | | 9/2003 | Sacchetti et al. |
| 6,646,073 | B2 | * | 11/2003 | Farrer et al. ..................... 526/144 |
| 6,759,492 | B2 | | 7/2004 | Farrer et al. |
| 2002/0086794 | A1 | | 7/2002 | Sacchetti et al. |
| 2003/0027952 | A1 | | 2/2003 | Farrer et al. |

FOREIGN PATENT DOCUMENTS

CN    1320129     10/2001
KR    10-0789236  1/2008

* cited by examiner

*Primary Examiner* — Yong Chu
*Assistant Examiner* — Sonya Wright

(57) ABSTRACT

The present invention relates to catalysts systems for the polymerization of olefins $CH_2=CHR$, wherein R is an alkyl, cycloalkyl or aryl radical having 1-12 carbon atoms, comprising (A) a solid catalyst component comprising Ti, Mg, and halogen (B) an aluminum alkyl compound and (C) a brominated cyclic hydrocarbon. Said catalyst systems have improved polymerization activity.

2 Claims, No Drawings

CATALYST FOR THE POLYMERIZATION OF OLEFINS

This application is the U.S. national stage under 35 U.S.C. §371 of Int. Appl. No. PCT/EP2009/056952, filed 5 Jun. 2009, and claims priority to Eur. Appl. No. 08158175.3 filed 13 Jun. 2008 and provisional U.S. Appl. No. 61/132,345 filed 18 Jun. 2008; the disclosures of Int. Appl. No. PCT/EP2009/056952, Eur. Appl. No. 08158175.3 and U.S. Appl. No. 61/132,345, each as filed, are incorporated herein by reference.

The present invention relates to catalysts for the polymerization of olefins, in particular ethylene and its mixtures with olefins $CH_2=CHR$, wherein R is an alkyl, cycloalkyl or aryl radical having 1-12 carbon atoms, comprising a solid catalyst component comprising Ti, Mg, halogen and optionally an electron donor, an aluminum alkyl compound and one or more brominated compounds as activity enhancers. The catalysts of the invention are suitably used in any olefin polymerization process to prepare olefin homo or copolymers.

The polymerization activity is a very important factor in any polymerization process. For a given catalyst system, it may depends on the polymerization conditions, such as temperature and pressure. However, once fixed the polymerization conditions the activity depends strictly on the catalyst system and when the activity is not satisfactory the amount of catalyst fed to the reactor must be increased or its residence time made longer. Both solutions penalize the plant operability w as the increase of catalyst fed means increase of the cost per unity of polymer produced, while the increase of the residence time means a lower productivity of the plant.

In view of this importance, the need of increasing the catalyst activity is always felt. The Ziegler-Natta catalyst are generally obtained by reacting an aluminum alkyl compound with a solid catalyst component comprising a magnesium halide and a titanium compound containing at least a Ti-halogen bond. As the catalyst component determines both the activity and the polymer properties, once the catalyst system has been chosen for industrial production it is changed for a different one having higher activity only if the new one maintains basically unaltered the polymer properties. This is the reason why it is felt the need of modifying the polymerization activity of a certain catalyst system without changing its capability to produce a polymer with certain properties.

Particularly in the ethylene polymerization processes where the catalyst system, differently from the polypropylene catalysts, usually does not comprise external donor compounds for increasing the stereospecificity, the attempt for increasing the activity commonly involves the use of halogenated hydrocarbon compounds as activity enhancer. Such a use is disclosed for example in U.S. Pat. No. 5,863,995, U.S. Pat. No. 5,990,251 and U.S. Pat. No. 4,657,998. WO03/010211 and WO04/037873 relate to gas-phase polymerization processes employing a Ziegler-Natta catalyst component, an aluminum alkyl and a saturated halogenated hydrocarbon in certain specific ratios. According to the description, no criticality is associated to the use of brominated hydrocarbons while in the examples brominated compounds are not tested.

The applicant has now found a novel catalyst system for the (co)polymerization of ethylene, based on a different type of activity enhancer, comprising (A) a solid catalyst component comprising Ti, Mg, halogen, (B) an aluminum alkyl compound and (C) a brominated cyclic hydrocarbon.

The brominated cyclic hydrocarbons (C) can be mono or polybrominated. The preferred ones are the monobrominated having from 3 to 10 carbon atoms, preferably from 4 to 7 in the cycle. The cyclic brominated hydrocarbons can have a single cycle or two or more condensed cyclic structure, the monocyclic brominated hydrocarbons being preferred. Preferred compounds are cyclopropyl bromide, cyclobutyl bromide, cyclopentyl bromide, cyclohexyl bromide, cycloheptyl bromide, 1-adamantyl bromide, 2-adamantyl bromide.

The brominated cyclic hydrocarbons (C) are used in amounts such as to give a (B)/(C) molar ratio ranging from 0.1 to 100, preferably from 1 to 50 and more preferably from 5 to 30.

In a preferred aspect the catalyst component of the invention comprises a Ti compound having at least one Ti-halogen bond supported on a magnesium chloride which is preferably magnesium dichloride and more preferably magnesium dichloride in active form. In the context of the present application the term magnesium chloride means magnesium compounds having at least one magnesium chloride bond. As mentioned before, the catalyst component may also contain groups different from halogen, in any case in amounts lower than 0.5 mole for each mole of titanium and preferably lower than 0.3.

The catalyst components A are further characterized by a porosity ($P_F$), measured by the mercury method and due to pores with radius equal to or lower than 1 μm, of at least 0.30 $cm^3/g$, preferably higher than 0.40 $cm^3/g$ and more preferably higher than 0.50 $cm^3/g$ usually in the range 0.50-0.80 $cm^3/g$. The total porosity $P_T$ can be in the range of 0.50-1.50 $cm^3/g$, particularly in the range of from 0.60 and 1.20 $cm^3/g$. In the catalyst components of the invention the average pore radius value, for porosity due to pores up to 1 μm, is preferably in the range from 600 to 1200 Å.

Preferably, the particles of solid component have a substantially spherical morphology and average diameter comprised between 5 and 150 μm, preferably from 20 to 100 μm and more preferably from 30 to 90 μm. As particles having substantially spherical morphology, those are meant wherein the ratio between the greater axis and the smaller axis is equal to or lower than 1.5 and preferably lower than 1.3.

The magnesium dichloride in the active form is characterized by X-ray spectra in which the most intense diffraction line which appears in the spectrum of the non active chloride (lattice distanced of 2.56 Å) is diminished in intensity and is broadened to such an extent that it becomes totally or partially merged with the reflection line falling at lattice distance (d) of 2.95 Å. When the merging is complete the single broad peak generated has the maximum of intensity which is shifted towards angles lower than those of the most intense line.

The solid components of the invention may comprise an electron donor compound (internal donor), selected for example among ethers, esters, amines and ketones. The electron donor compound may be used in amount such as to give ED/Ti ratios lower than 3, preferably lower than 1 and more preferably not to include any amount of electron donor compound in order for it to be absent in the final solid catalyst component (A).

The preferred titanium compounds have the formula $Ti(OR^{II})_nX_{y-n}$, wherein n is a number comprised between 0 and 0.5 inclusive, y is the valence of titanium, $R^{II}$ is an alkyl, cycloalkyl or aryl radical having 1-8 carbon atoms and X is halogen. In particular $R^{II}$ can be ethyl, isopropyl, n-butyl, isobutyl, 2-ethylhexyl, n-octyl and phenyl, (benzyl); X is preferably chlorine.

If y is 4, n varies preferably from 0 to 0.02; if y is 3, n varies preferably from 0 to 0.015. $TiCl_4$ is especially preferred.

A method suitable for the preparation of spherical components mentioned above comprises a step (a) in which a compound $MgCl_2.mR^{III}OH$, wherein $0.3 \leq m \leq 1.7$ and $R^{III}$ is an alkyl, cycloalkyl or aryl radical having 1-12 carbon atoms is reacted with the said titanium compound of the formula Ti(OR$^{II}$)$_n$X$_{y-n}$, in which n, y, X and R$^{II}$ have the same meaning defined above.

In this case MgCl$_2$.mR$^{III}$OH represents a precursor of Mg dihalide. These kind of compounds can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034. Adducts having the desired final alcohol content can be obtained by directly using the selected amount of alcohol directly during the adduct preparation. However, if adducts with increased porosity are to be obtained it is convenient to first prepare adducts with more than 1.7 moles of alcohol per mole of MgCl$_2$ and then subjecting them to a thermal and/or chemical dealcoholation process. The thermal dealcoholation process is carried out in nitrogen flow at temperatures comprised between 50 and 150° C. until the alcohol content is reduced to the value ranging from 0.3 to 1.7. A process of this type is described in EP 395083.

Generally these dealcoholated adducts are also characterized by a porosity (measured by mercury method) due to pores with radius due to pores with radius up to 0.1 μm ranging from 0.15 to 2.5 cm$^3$/g preferably from 0.25 to 1.5 cm$^3$/g.

In the reaction of step (a) the molar ratio Ti/Mg is stoichiometric or higher; preferably this ratio in higher than 3. Still more preferably a large excess of titanium compound is used. Preferred titanium compounds are titanium tetrahalides, in particular TiCl$_4$. The reaction with the Ti compound can be carried out by suspending the adduct in cold TiCl$_4$ (generally 0° C.); the mixture is heated up to 80-140° C. and kept at this temperature for 0.5-8 preferably from 0.5 to 3 hours. The excess of titanium compound can be separated at high temperatures by filtration or sedimentation and siphoning.

The catalyst component (B) of the invention is selected from Al-alkyl compounds possibly halogenated. In particular, it is selected from Al-trialkyl compounds, for example Al-trimethyl, Al-triethyl, Al-tri-n-butyl, Al-triisobutyl are preferred. The Al/Ti ratio is higher than 1 and is generally comprised between 5 and 800.

The above-mentioned components (A)-(C) can be fed separately into the reactor where, under the polymerization conditions can exploit their activity. It may be advantageous to carry out a pre-contact of the above components, optionally in the presence of small amounts of olefins, for a period of time ranging from 0.1 to 120 minutes preferably in the range from 1 to 60 minutes. The pre-contact can be carried out in a liquid diluent at a temperature ranging from 0 to 90° C. preferably in the range of 20 to 70° C.

The so formed catalyst system can be used directly in the main polymerization process or alternatively, it can be pre-polymerized beforehand. A pre-polymerization step is usually preferred when the main polymerization process is carried out in the gas phase. The prepolymerization can be carried out with any of the olefins CH$_2$=CHR, where R is H or a C1-C10 hydrocarbon group. In particular, it is especially preferred to pre-polymerize ethylene, propylene or mixtures thereof with one or more α-olefins, said mixtures containing up to 20% in moles of α-olefin, forming amounts of polymer from about 0.1 g per gram of solid component up to about 1000 g per gram of solid catalyst component. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred. The pre-polymerized catalyst component can also be subject to a further treatment with a titanium compound before being used in the main polymerization step. In this case the use of TiCl$_4$ is particularly preferred. The reaction with the Ti compound can be carried out by suspending the prepolymerized catalyst component in the liquid Ti compound optionally in mixture with a liquid diluent; the mixture is heated to 60-120° C. and kept at this temperature for 0.5-2 hours.

The catalysts of the invention can be used in any kind of polymerization process both in liquid and gas-phase processes. Catalysts having small particle size, (less than 40 μm) are particularly suited for slurry polymerization in an inert medium, which can be carried out continuously stirred tank reactor or in loop reactors. Catalysts having larger particle size are particularly suited for gas-phase polymerization processes which can be carried out in agitated or fluidized bed gas-phase reactors.

As already mentioned, the catalysts of the present invention show a high polymerization activity in the (co)polymerization of ethylene. In addition, they are able to maintain substantially unchanged or even improved the morphological properties of the polymer (bulk density) although it is produced with higher yields. This is particularly important for the production of ethylene polymers having high melt flow index which are fragile and produced under conditions (high hydrogen concentration) which depress the polymerization activity. In this respect, it has been observed that the catalyst system of the invention, particularly when the compound (C) is chosen among monocyclic brominated compounds, also show an improved hydrogen response evidenced by the high values of flow index in respect of the amount of hydrogen used during polymerization.

In addition, to the ethylene homo and copolymers mentioned above the catalysts of the present invention are also suitable for preparing very-low-density and ultra-low-density polyethylenes (VLDPE and ULDPE, having a density lower than 0.920 g/cm$^3$, to 0.880 g/cm$^3$) consisting of copolymers of ethylene with one or more alpha-olefins having from 3 to 12 carbon atoms, having a mole content of units derived from ethylene of higher than 80%; elastomeric copolymers of ethylene and propylene and elastomeric terpolymers of ethylene and propylene with smaller proportions of a diene having a content by weight of units derived from ethylene of between about 30 and 70%.

The following examples are given in order to further describe the present invention in a non-limiting manner.

CHARACTERIZATION

The properties are determined according to the following methods:

General Procedure for the HDPE Polymerization Test

Into a 1.5 liters stainless steel autoclave, degassed under N$_2$ stream at 70° C., 500 ml of anhydrous hexane, the catalyst component, 1.8 mol of triethylaluminum (TEA) and the reported amount of the (C) compound were introduced. The mixture was stirred, heated to 75° C. and thereafter 3 bar of H$_2$ and 7 bar of ethylene were fed. The polymerization lasted 2 hours. Ethylene was fed to keep the pressure constant. At the end, the reactor was depressurized and the polymer thus recovered was dried under vacuum at 70° C.

EXAMPLE 1-4 AND COMPARISON EXAMPLE 1

Preparation of the Solid Component (A)

A magnesium chloride and alcohol adduct containing about 3 mols of alcohol was prepared following the method described in example 2 of U.S. Pat. No. 4,399,054, but working at 2000 RPM instead of 10000 RPM. The adduct were subject to a thermal treatment, under nitrogen stream, over a temperature range of 50-150° C. until a weight content of 25% of alcohol was reached.

Into a 2 L four-necked round flask, purged with nitrogen, 1 L of TiCl$_4$ was introduced at 0° C. Then, at the same temperature, 70 g of a spherical MgCl$_2$/EtOH adduct containing 25% wt of ethanol and prepared as described above were added under stirring. The temperature was raised to 140° C. in 2 h and maintained for 60 min. Then, the stirring was discontinued, the solid product was allowed to settle and the supernatant liquid was siphoned off. The solid residue was then washed once with heptane at 80° C. and five times with hexane at 25° C. and dried under vacuum at 30° C. and analyzed. The solid catalyst component (A) was employed in the ethylene polymerization according to the general procedure using the type and amount of commercially available brominated cyclic compound (C) reported in table 1 together with the polymerization results.

TABLE 1

| EX. | Comp. C | AlR$_3$/C (mol ratio) | Activity (g/g) | Bulk Density | MIE |
|---|---|---|---|---|---|
| 1 | Cyclopentyl-Br | 10 | 26400 | 239 | 1.16 |
| 2 | Cyclohexyl-Br | 10 | 26800 | 234 | 0.74 |

TABLE 1-continued

| EX. | Comp. C | AlR$_3$/C (mol ratio) | Activity (g/g) | Bulk Density | MIE |
|---|---|---|---|---|---|
| 3 | 1-adamantyl-Br | 10 | 20500 | 260 | 0.39 |
| Comp. 1 | — | | 18000 | 243 | 0.46 |

The invention claimed is:

1. A process for the (co)polymerization of ethylene comprising (co)polymerizing ethylene in the presence of a catalyst system comprising:
   (A) a solid catalyst component comprising Ti, Mg and halogen;
   (B) an aluminum alkyl compound; and
   (C) a composition compound having the formula:

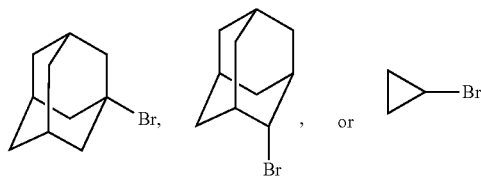

wherein the compound (C) is used in amounts to give a (B)/(C) molar ratio ranging from 1 to 50, and said components (A)-(C) are fed separately into the polymerization reactor or are pre-contacted for a period of time ranging from 0.1 to 120 minutes at a temperature ranging from 0 to 90° C.

2. The process of claim 1 wherein solid catalyst component (A) has a porosity (P$_F$), measured by the mercury method of at least 0.3 cm$^3$/g and due to pores with radius equal to or lower than 1 μm.

* * * * *